Dec. 13, 1932.    O. W. YOUNG    1,890,839
SEAL OR GUARD
Filed Oct. 12, 1929    2 Sheets-Sheet 1

INVENTOR.
OTTO W. YOUNG.
BY
HIS ATTORNEY

Dec. 13, 1932.  O. W. YOUNG  1,890,839
SEAL OR GUARD
Filed Oct. 12, 1929    2 Sheets-Sheet 2

INVENTOR.
OTTO W. YOUNG.
BY
HIS ATTORNEY.

Patented Dec. 13, 1932

1,890,839

UNITED STATES PATENT OFFICE

OTTO W. YOUNG, OF EAST ORANGE, NEW JERSEY, ASSIGNOR TO GENERAL MOTORS CORPORATION, OF DETROIT, MICHIGAN, A CORPORATION OF DELAWARE

SEAL OR GUARD

Application filed October 12, 1929. Serial No. 399,373.

This invention relates to seals or guards and comprises all the features of novelty herein disclosed. An object of the invention is to provide an improved seal or guard for sealing the space between a shaft and a casing. Another object is to provide an improved cap for preventing leakage of lubricant from a casing and entrance of foreign matter to the casing. To these ends and to improve generally and in detail upon devices of this character the invention also consists in the various matters hereinafter described and claimed.

In its broader aspects the invention is not necessarily limited to the specific constructions selected for illustrative purposes in the accompanying drawings in which Fig. 1 is a vertical section of a portion of a journal box.

Figure 1:
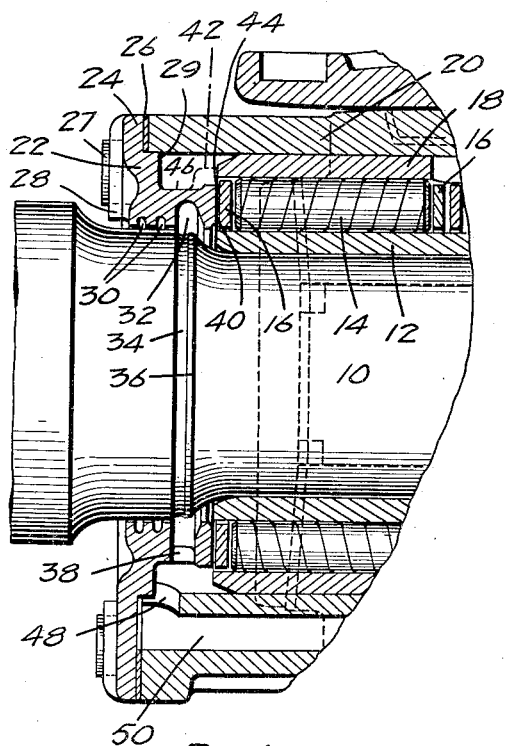
Figure 2:
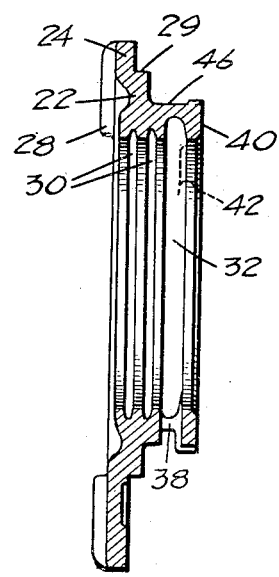
Fig. 2 is a sectional view of an end cap.
Figure 3:
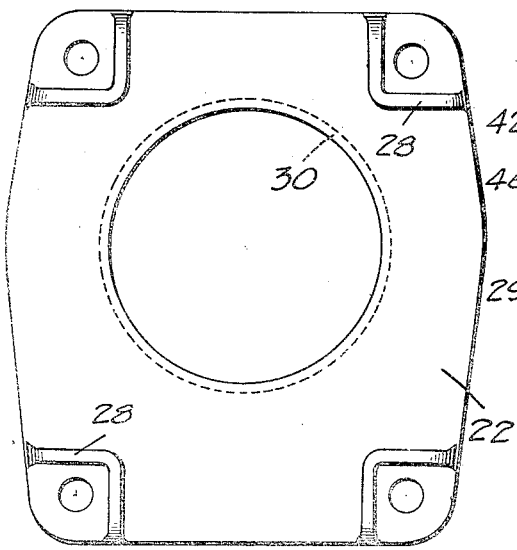
Figs. 3 and 4 are end views of the cap.
Figure 4:
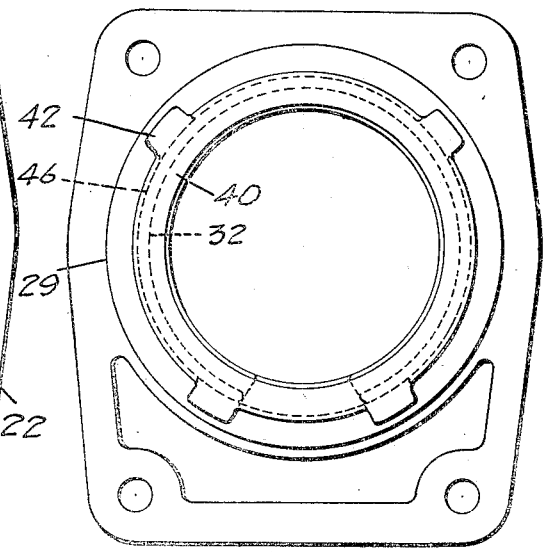

The numeral 10 indicates a shaft or axle carrying a raceway sleeve 12 for roller bearings 14 having end rings 16. The rollers run on an outer raceway sleeve 18 confined in a straight cylindrical bore of a journal box or casing 20. A cap 22 having a flange 24 engaging a gasket 26 is secured to the box by through bolts 27, the heads of the bolts being held by ribs 28 on the end cap. A portion 29 of the cap fits the bore of the box and its inner wall is provided with grease grooves 30 at the axle. A wide groove 32 of the cap is arranged outside of a groove 34 and a rib 36 on the axle to receive oil thrown off from the rib and conduct it through a hole 38 to the bottom of the box. The cap has a flat face 40 to take the induced thrust of the adjacent end ring 16 and a series of lugs 42 to position the outer race sleeve 18. The space 44 at the top of the box between adjacent lugs allows the oil propelled by the rollers to pass out of the sleeve 18 into a relief groove 46 which conducts oil around the cap to an opening 48 communicating with a cored out lubricant receptacle 50 at the bottom of the box. This relief groove prevents the building up of an oil pressure tending to force oil along the axle past the grease grooves and makes those grease grooves present a much more efficient seal against leakage.

Figure 5:
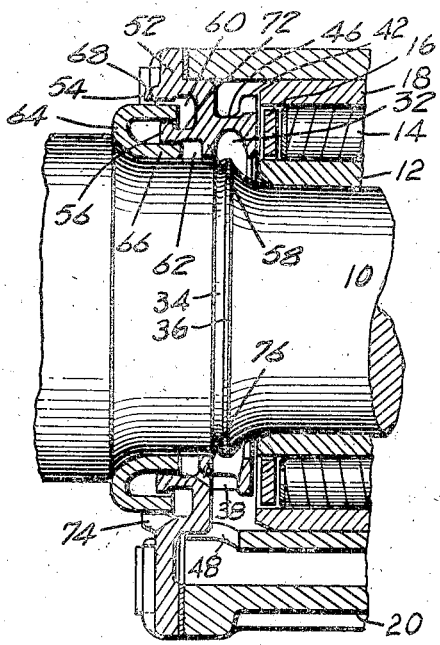
Fig. 5 is a vertical section of another form of the invention.

In Fig. 5, the construction is similar, the chief difference being in the seal between the end cap and axle. The cap 52 has axially projecting flanges 54 and 56 and a radial flange 58, these flanges forming a groove 60 and a groove 62. A guard ring 64, of substantially U-shaped cross-section, has its inner wall 66 pressed on the axle against a shoulder and extending to the groove 62, the exterior of this inner wall having close running clearance with the axial flange 56. The outer wall 68 of the guard ring extends axially into the groove 60, the exterior having a close running clearance with the flange 54. Hence any water that might find its way into the groove 60 would drain around a wall 72 and out through a slot 74 at the bottom of the flange 54. Any oil that might creep from the box into the grease groove 62 would drain back into the box through a hole 76. The box and axle can have relative longitudinal play without destroying the close fit of the seal.

Figure 6:
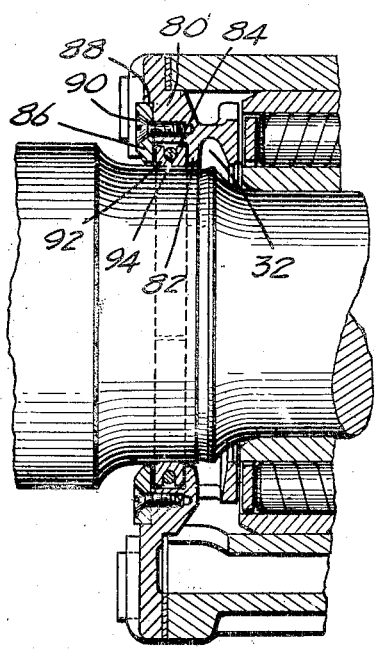
Figs. 6, 7 and 8 are similar views of other modified forms.

In Fig. 6, the cap 80 has a radial flange 82 extending close to the axle, and outside the flange is an annular recess 84 closed by a flat plate 86 in the form of a ring just clearing the axle. The plate 86 is secured in an annular recess 88 of the cap by screws 90 the counter-sunk heads of which are prick-punched at intervals into the plate. In the recess 84 is a split spring ring 92 having a peripheral groove receiving a split spring ring 94 which makes the ring 92 hug the axle. The ring 92 is preferably of bronze and has a close running fit with the walls of its recess. Relative longitudinal movement between the box and axle can occur, the ring 92 sliding on the axle but maintaining close engagement therewith to seal the box against escape of lubricant or entrance of foreign matter.

Figure 7:
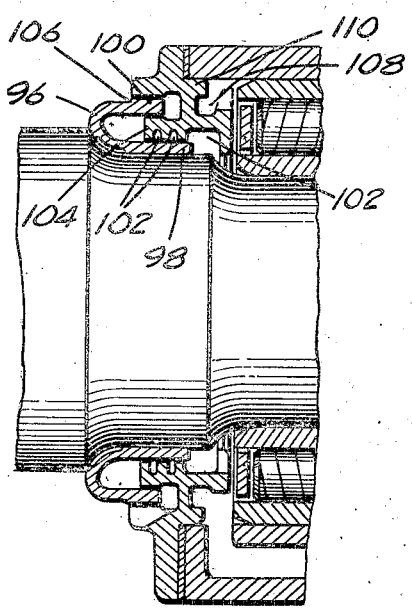

In Fig. 7, the construction is similar to that of Fig. 5, the seal against escape of oil being more efficient. The guard ring 96 has its inner wall 98 longer than the outer wall 100 and extended partly into the wide groove 102. The exterior of the wall 98 is in close running relation to grease grooves 102 on a flange 104. The exterior of the outer wall 100 has a raised portion at the end forming a groove or bevel 106 adjacent to the surrounding flange to shed foreign matter. The relief groove 108 extends deeper into the end cap inside a flange 110 thereof.

Figure 8:
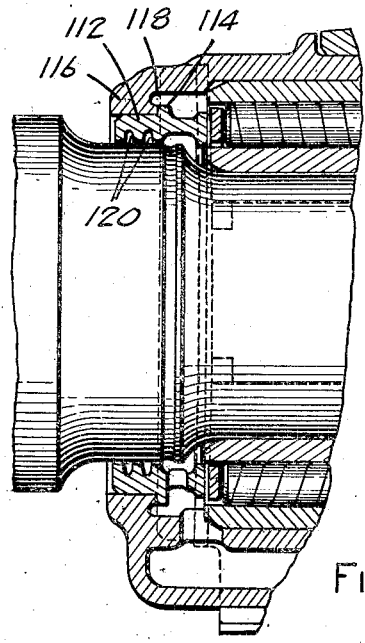

In Fig. 8, the end cap 112 is put in through the interior of the box, its locating collar 114 passing freely through the outer bearing sleeve and engaging a flange 116 on the box inside a groove 118 of the box. The cap fits a round bore in the flange 116 and has grease grooves 120 at the shaft. The cap is thinner than those previously described and requires no fastening bolts but otherwise is similar to the other forms.

I claim:

1. In a device of the character described, a casing, a shaft extending into the casing, a bearing between the shaft and the casing, an end cap secured at the end of the casing and making a close joint with the shaft, the cap having an axially extending flange with a thrust face for the bearing, and the exterior wall of the flange having a peripheral relief groove communicating with the bearing to conduct lubricant therefrom; substantially as described.

2. In a device of the character described, a casing, a shaft extending into the casing, a bearing between the shaft and the casing, an end cap secured at the end of the casing and making a close joint with the shaft, the cap having an axially extending flange with a thrust face for the bearing, the flange also having spaced lugs to locate the outer race of the bearing and a peripheral relief groove communicating with the bearing; substantially as described.

3. In a device of the character described, a casing, a shaft extending into the casing, a bearing between the shaft and the casing, an end cap secured at the end of the casing and making a close joint with the shaft, the cap having an axially extending flange with spaced lugs to locate the outer race of the bearing, and the exterior wall of the flange having a peripheral relief groove communicating with the bearing; substantially as described.

4. A cap for closing the space between a shaft and a casing and comprising a ring having oppositely extending axial flanges, one of said flanges having its outer wall provided with a peripheral relief groove, and the other of said flanges having its outer wall provided with a peripheral drain groove; substantially as described.

In testimony whereof I hereunto affix my signature.

OTTO W. YOUNG.